United States Patent
Joret et al.

(10) Patent No.: US 9,004,548 B2
(45) Date of Patent: Apr. 14, 2015

(54) DEVICE FOR LOCKING AN OPENING PART OF A JET ENGINE NACELLE WITH RESPECT TO A FIXED PART, AND NACELLE EQUIPPED WITH SUCH A DEVICE

(75) Inventors: Jean-Philippe Joret, Beuzeville (FR); Guy Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 82 days.

(21) Appl. No.: 12/601,563

(22) PCT Filed: Mar. 28, 2008

(86) PCT No.: PCT/FR2008/000433
§ 371 (c)(1),
(2), (4) Date: Nov. 24, 2009

(87) PCT Pub. No.: WO2008/145832
PCT Pub. Date: Dec. 4, 2008

(65) Prior Publication Data
US 2010/0171319 A1 Jul. 8, 2010

(30) Foreign Application Priority Data
May 25, 2007 (FR) ...................................... 07 03699

(51) Int. Cl.
*E05C 19/10* (2006.01)
*E05C 19/14* (2006.01)
(Continued)

(52) U.S. Cl.
CPC .............. *E05C 19/145* (2013.01); *B64D 29/06* (2013.01); *E05B 1/00* (2013.01); *E05B 13/00* (2013.01); *E05B 17/22* (2013.01)

(58) Field of Classification Search
CPC .. E05B 63/0056; E05B 1/0092; B65D 45/345
USPC ........... 292/56, 62, 95, 96, 97, 102, 158, 139, 292/167, 223, 196, 109, 113, 123, 1, 100, 292/265, 265.69, 207, DIG. 31, DIG. 49
See application file for complete search history.

(56) References Cited

U.S. PATENT DOCUMENTS 1,001,547 A * 8/1911 McMillen ...................... 254/217
2,927,812 A * 3/1960 Smith et al. ................... 292/196
(Continued)

FOREIGN PATENT DOCUMENTS

EP 0839714 A1 5/1997

OTHER PUBLICATIONS

International Search Report PCT/FR2008/000433; Dated Dec. 8, 2008.

*Primary Examiner* — Kristina Fulton
*Assistant Examiner* — Nathan Cumar
(74) *Attorney, Agent, or Firm* — Brinks Gilson & Lione

(57) ABSTRACT

This device for locking an opening part (9) of a jet engine nacelle with respect to a fixed part (7, 17) comprises: means (13, 16) for locking said opening part (9) with respect to said fixed part (7, 17), means for actuating (21) these locking means that are mounted such that they can move on said opening part (9) between a closed position, in which they enable said locking means (13, 16) to be immobilized, and an open position, in which they enable these locking means (13, 16) to be released. Said actuating means comprise gripping means (21). This device comprises means (41, 43) for immobilizing, in the open position, said gripping means (21) with respect to said opening part (9) at least in the direction of movement of said opening part (9).

5 Claims, 14 Drawing Sheets

(51) Int. Cl.
*B64D 29/06* (2006.01)
*E05B 1/00* (2006.01)
*E05B 13/00* (2006.01)
*E05B 17/22* (2006.01)

(56) References Cited

U.S. PATENT DOCUMENTS

| | | | |
|---|---|---|---|
| 3,576,337 A * | 4/1971 | Gudde | 292/201 |
| 4,053,177 A * | 10/1977 | Stammreich et al. | 292/113 |
| 4,268,077 A * | 5/1981 | Bohleen et al. | 292/336.3 |
| 4,510,779 A * | 4/1985 | Ahad | 70/208 |
| 4,768,815 A | 9/1988 | Harmon | |
| 4,826,221 A * | 5/1989 | Harmon | 292/167 |
| 5,076,514 A * | 12/1991 | Melcher | 244/129.4 |
| 5,138,753 A * | 8/1992 | Benjamin | 29/238 |
| 5,984,382 A * | 11/1999 | Bourne et al. | 292/113 |
| 6,036,238 A * | 3/2000 | Lallament | 292/100 |
| 6,042,174 A * | 3/2000 | Durrani | 296/121 |
| 6,279,971 B1 * | 8/2001 | Dessenberger, Jr. | 292/113 |
| 6,343,815 B1 | 2/2002 | Poe | |
| 6,634,140 B1 * | 10/2003 | Sellman | 49/340 |
| 7,029,040 B2 * | 4/2006 | Lippoldt et al. | 292/201 |
| 7,752,717 B2 * | 7/2010 | Hanson | 24/68 CD |

\* cited by examiner

DEVICE FOR LOCKING AN OPENING PART OF A JET ENGINE NACELLE WITH RESPECT TO A FIXED PART, AND NACELLE EQUIPPED WITH SUCH A DEVICE

TECHNICAL FIELD

The present invention relates to a device for locking an opening portion of a turbojet nacelle relative to a fixed portion, and to a nacelle fitted with such a device.

BRIEF DISCUSSION OF RELATED ART

The prior art teaches of a system for locking an opening portion of a turbojet nacelle relative to a fixed portion, typically comprising:
- means for locking said opening portion relative to said fixed portion, and
- means for actuating these locking means, mounted so as to be able to move on said opening portion between a closed position in which they allow the immobilization of said locking means and an open position in which they allow the release of these locking means.

Such a system typically makes it possible to lock together the half-cowls of a turbojet nacelle that are capable of opening upwards by pivoting about spindles substantially parallel to the spindle of the nacelle.

Once these two cowls are unlocked, specific means, such as hydraulic or electric cylinders, act on these two cowls so as to make it possible to open them.

These specific actuation means have a not inconsiderable weight and installing them inside the nacelle involves a certain complexity.

The following disclosure seeks to dispense with these drawbacks.

BRIEF SUMMARY

The disclosure provides a device for locking an opening portion of a nacelle of a turbojet relative to a fixed portion, comprising:
- means for locking said opening portion relative to said fixed portion,
- means for actuating these locking means mounted so as to be able to move on said opening portion between a closed position in which they allow the immobilization of said locking means and an open position in which they allow the release of these locking means, this device being noteworthy in that said actuation means comprise gripping means and in that it comprises means for immobilizing in the open position said gripping means relative to said opening portion at least in the direction of movement of said opening portion.

By virtue of the presence of these gripping means and of the possibility of immobilizing them in the direction of movement of the opening portion, it is possible to manually move the opening portion relative to the fixed portion: it is therefore no longer necessary to provide actuation means dedicated to the movements of the opening portion, which makes it possible to save weight and complexity.

According to other optional features of the device according to the invention:
- said gripping means are able to move in rotation between said closed and open positions,
- said gripping means can be moved in translation between said closed and open positions,
- said locking means comprise at least one hook mounted so as to be able to move on said opening portion and capable of interacting with a counter-hook formed in said fixed portion,
- said locking means comprise at least one finger mounted so as to be able to move on said opening portion and capable of interacting with an orifice formed in said fixed portion,
- said immobilization means comprise at least one finger mounted so as to be able to move on said opening portion and capable of interacting with an immobilization notch secured to this opening portion,
- said immobilization means comprise an immobilizing cam,
- said immobilization means comprise a sheath in which said gripping means are mounted,
- this device comprises a trigger for releasing said gripping means: this trigger makes it possible, with a slight pressure, to make the gripping means accessible,
- this device comprises means for braking said opening portion relative to said fixed portion, and means for actuating these braking means, mounted on said gripping means: these braking means make it possible to prevent inadvertent movements of the opening portion during the maintenance operations,
- said locking means are electrically controlled by said actuation means,
- said locking means are geographically distinct from said actuation means: this makes it possible to reconcile the respective installations of the locking means and of the actuation means with the geometric constraints of the fixed and opening portions of the nacelle.

The present invention relates to a nacelle of a turbojet comprising a fixed portion and an opening portion, noteworthy in that it comprises a device for locking these two portions relative to one another according to the aforegoing.

According to an optional feature of this nacelle, said opening portion is mounted so as to slide relative to said fixed portion.

BRIEF DESCRIPTION OF THE DRAWINGS

Other features and advantages of the present invention will appear in the light of the following description and on examination of the appended figures in which.

DETAILED DESCRIPTION

In these figures, identical reference numbers designate identical or similar members.

Figure 1:
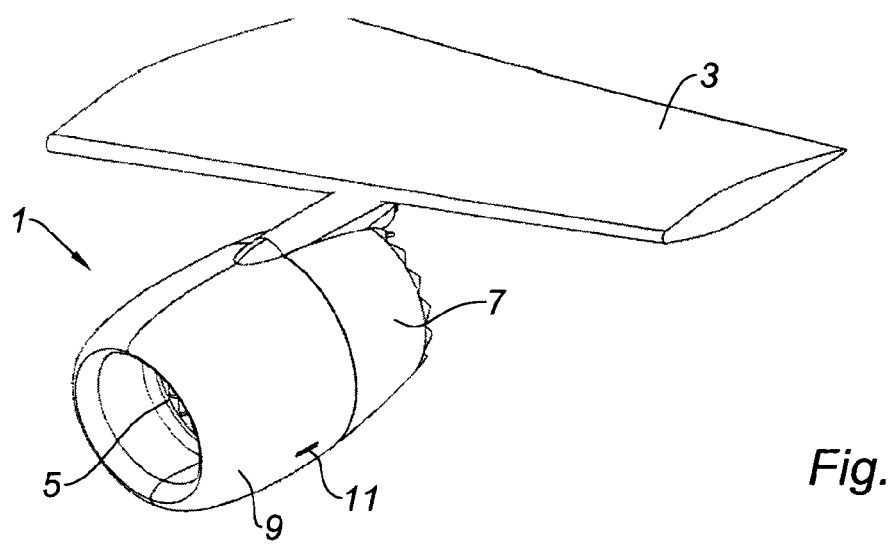
FIGS. 1 to 3 represent in perspective a nacelle according to the invention mounted beneath an aircraft wing, this nacelle being represented in three successive steps of movement of its opening portion relative to its fixed portion.
Figure 2:
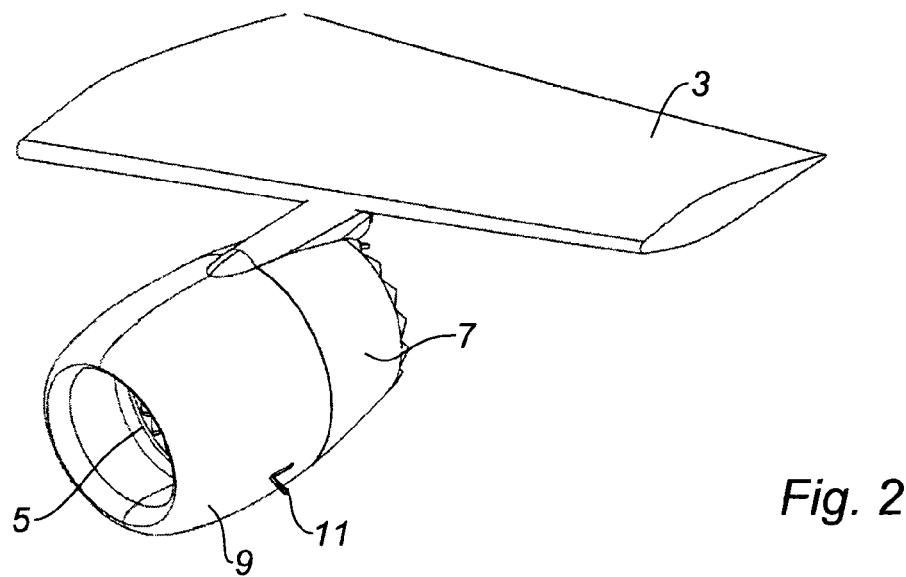
Figure 3:
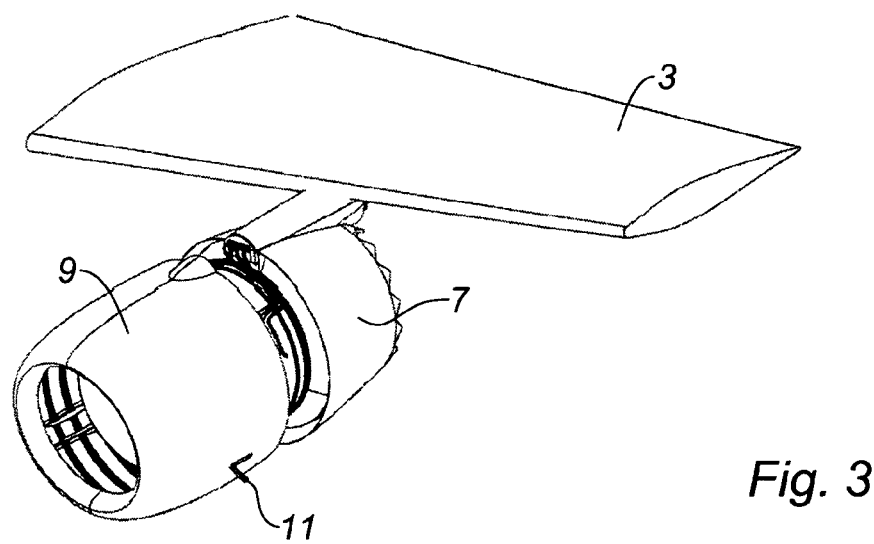

With reference to FIGS. 1 to 3, it can be seen that the nacelle 1 placed beneath an aircraft wing 3 and incorporating a turbojet 5 comprises on the one hand a rear fixed portion 7, and on the other hand a front opening portion 9 so as to allow access to the turbojet 5 for maintenance operations.

As can be seen in FIG. 3, the front portion of the nacelle 9 is opened by sliding relative to the rear fixed portion 7.

Before carrying out this sliding action, it is necessary to act on at least one locking device 11 so as to place it in an open position that can be seen in FIG. 2, making it possible to separate the front opening portion 9 from the rear fixed portion 7 of the nacelle 1.

The various ways of producing the locking device 11 will now be studied more closely. In the embodiment of FIGS. 4 to 16, this locking device comprises a hook 13 mounted so as to pivot about a spindle 15 inside the opening portion 9.

Figure 4:
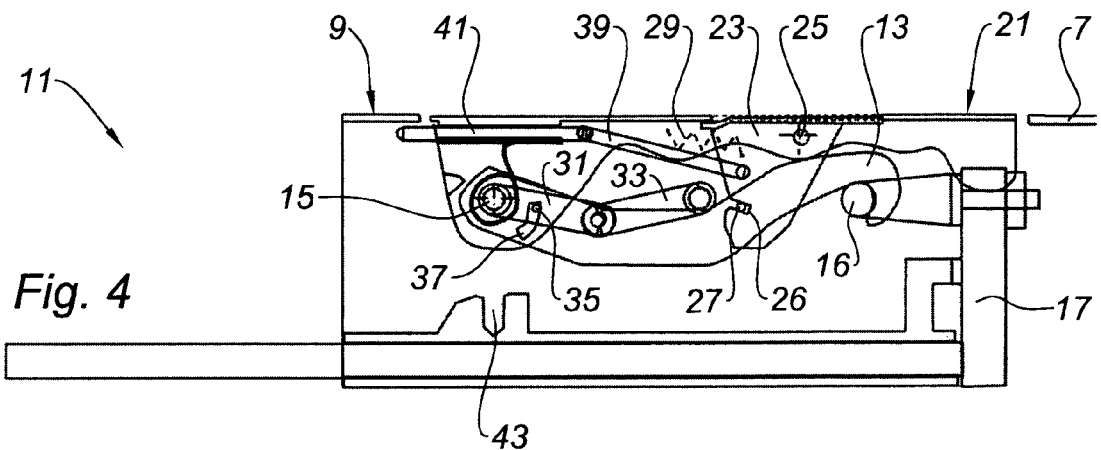
FIGS. 4 to 16 represent schematically an opening and closing sequence of a first embodiment of the locking device according to the invention.

In the closed position that can be seen in FIG. 4, this hook 13 interacts with a counter-hook 16 secured to a fixed portion 17 of the nacelle 1, itself secured to the rear fixed portion 7.

A gripping handle 21, flush with the outer wall of the opening portion 9 in the closed position shown in FIG. 4, is mounted so as to pivot about the spindle 15 of the hook 13.

A trigger 23 is mounted so as to pivot on the gripping handle 21 about a spindle 25 substantially parallel to the spindle 15.

This trigger 23 comprises a notch 26 which, in the closed position shown in FIG. 4, interacts with a pin 27 secured to the hook 13.

Elastic return means such as a spring 29 are interposed between the gripping handle 21 and the trigger 23 so as to return the latter to its position in which the notch 26 presses on the pin 27.

A first link rod 31 is mounted so as to pivot about the spindle 15 and a second link rod 33 is itself mounted so as to pivot on this first link rod and on the hook 13.

A pin 35 secured to the first link rod 31 interacts with a groove 37 formed in the gripping handle 21.

A third link rod 39 is mounted so as to pivot on the trigger 23 and interacts with a finger 41 mounted so as to slide on the gripping handle 21.

An immobilization notch 43 capable of interacting with the finger 41 is provided in the opening portion 9.

The operating mode of the locking device that has just been described in the closed position is as follows.

Figure 5:
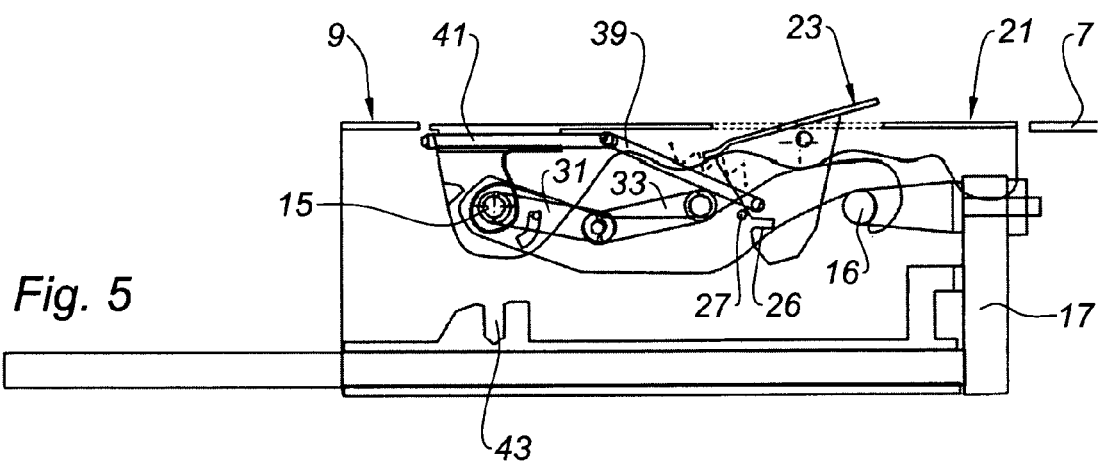

The user begins by pressing on the trigger 23 so as to make it pivot about its spindle 25 and to disengage its recess 26 from the pin 27 (see FIG. 5).

Figure 6:
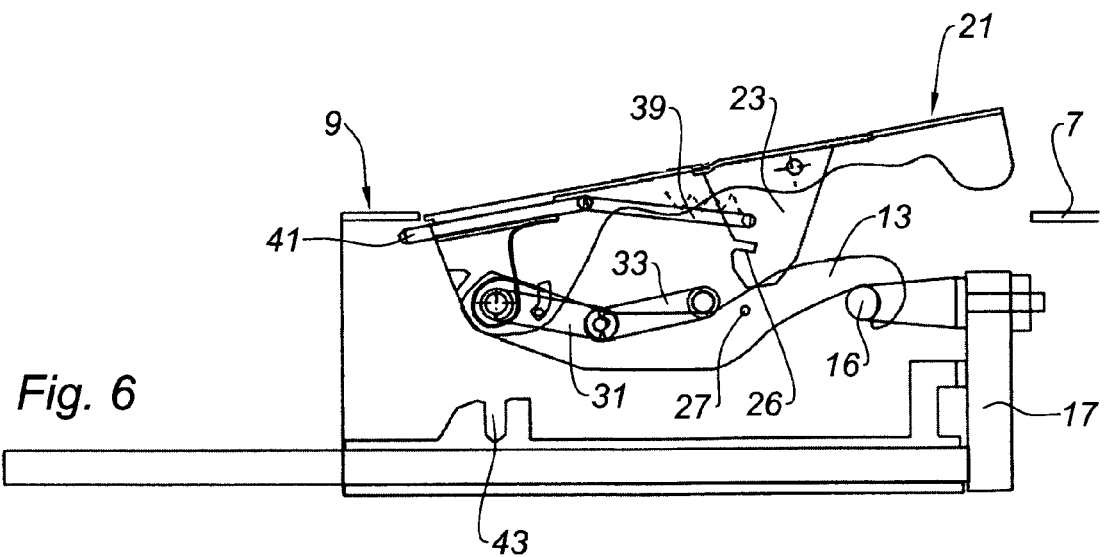
Figure 7:
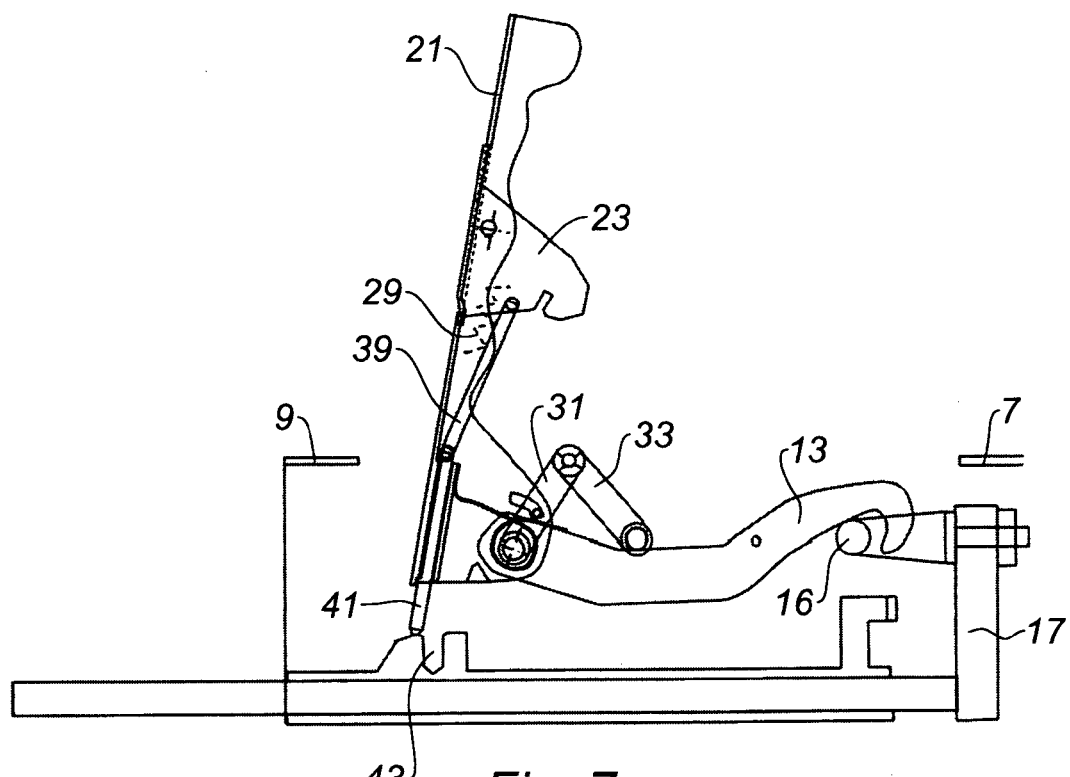
Figure 8:
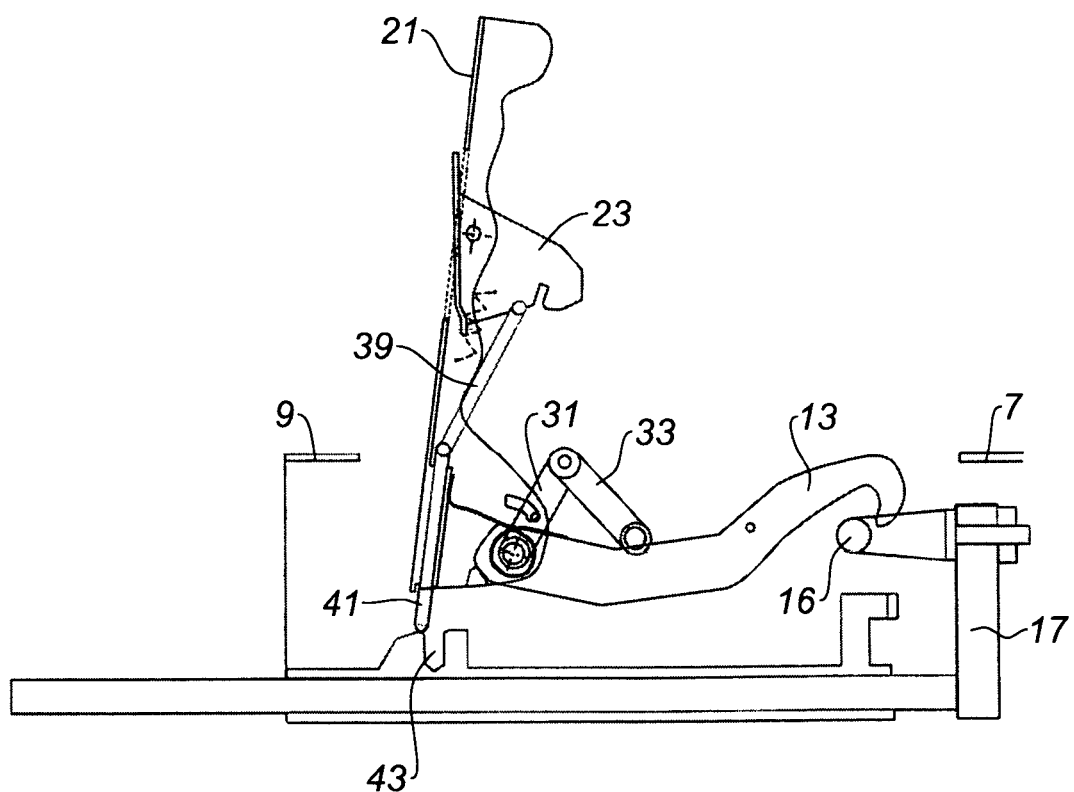

This disengagement makes it possible to leave the gripping handle 21 free to rotate (see FIG. 6).

This therefore causes the latter to pivot about its spindle 15. During this pivoting action, the groove 37 rotates the pin 35 and thereby the first and second link rods 31, 33 which allow the disengagement of the hook 13 from the counter-hook 16 (see FIGS. 7 and 8).

The rotary movement of the gripping handle 21 continues until the finger 41 engages in the immobilization notch 43 against the elastic return force exerted by the spring 29 on the trigger 23 and therefore on the third link rod 39.

Figure 9:
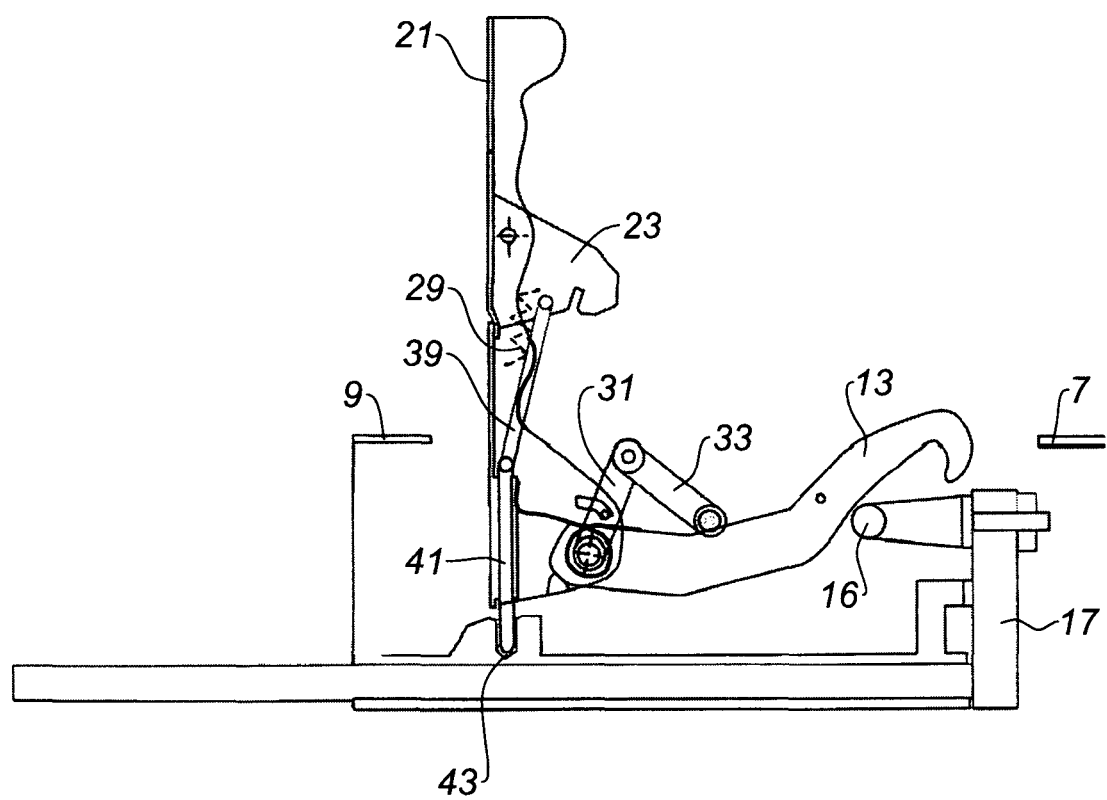
Figure 10:
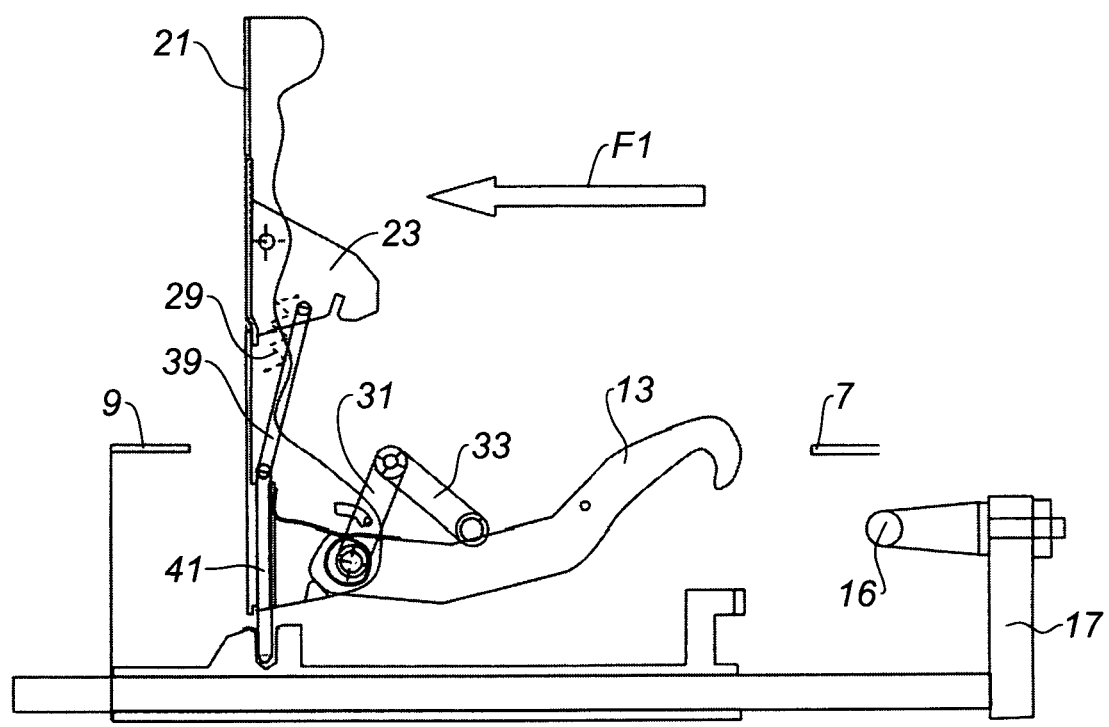
Figure 11:
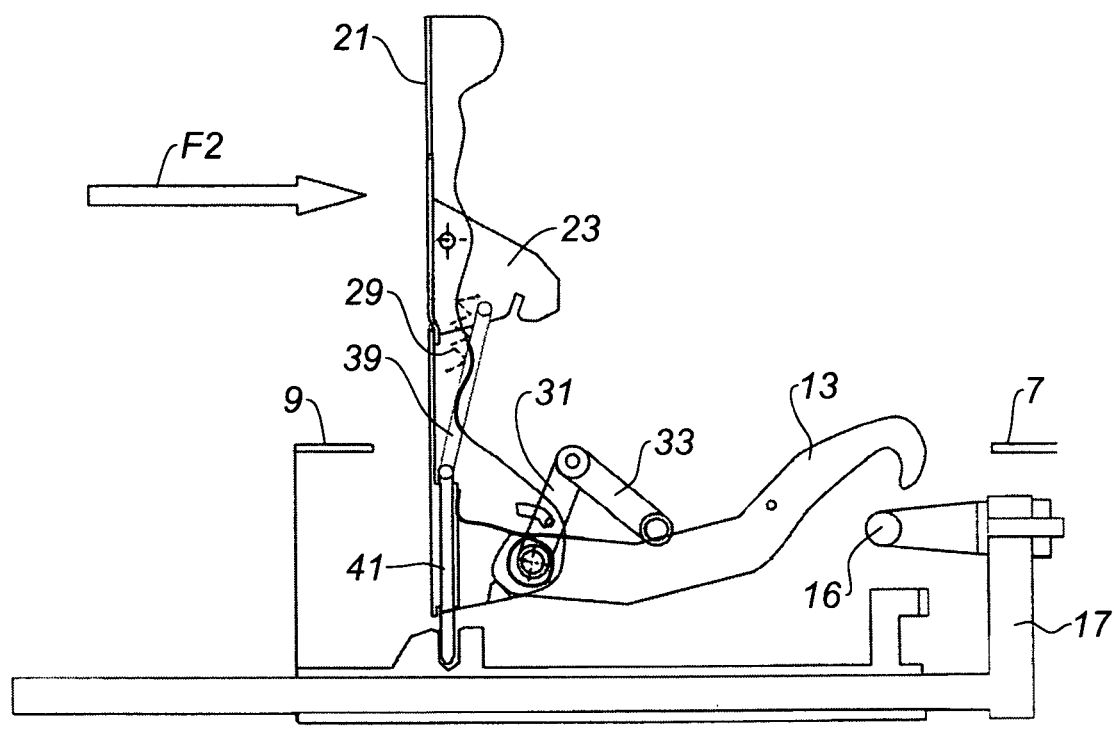

This engagement of the finger 41 in the immobilization notch 43 makes it possible to immobilize the gripping handle 21 in the position that can be seen in FIGS. 9 to 11, and therefore to use this gripping handle to move the opening portion 9 relative to the fixed portion 7, either in a direction allowing the opening of the former relative to the latter (see the arrow F1 in FIG. 10) or in the other direction (see the arrow F2 in FIG. 11).

Figure 12:
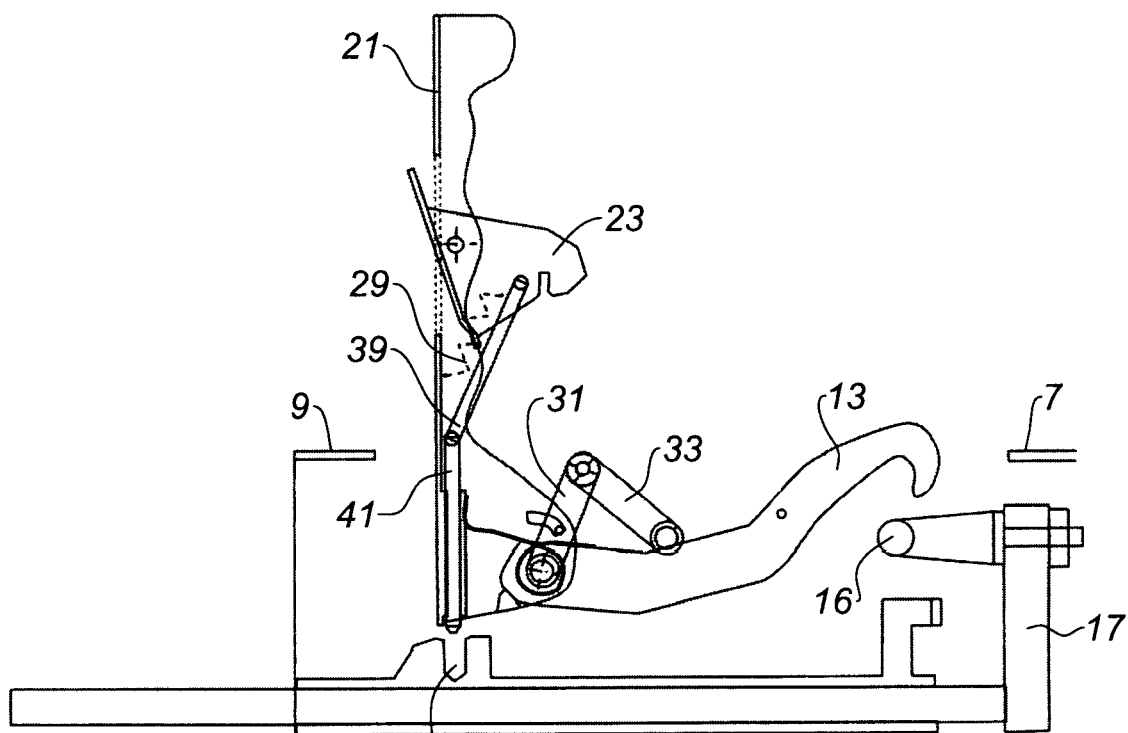

To close the locking device that has just been described, the user presses on the trigger 23 so as to make it pivot about its spindle 25 and thereby to extract the finger 41 from the immobilization notch 43 by means of the third link rod 39 (see FIG. 12).

Figure 13:
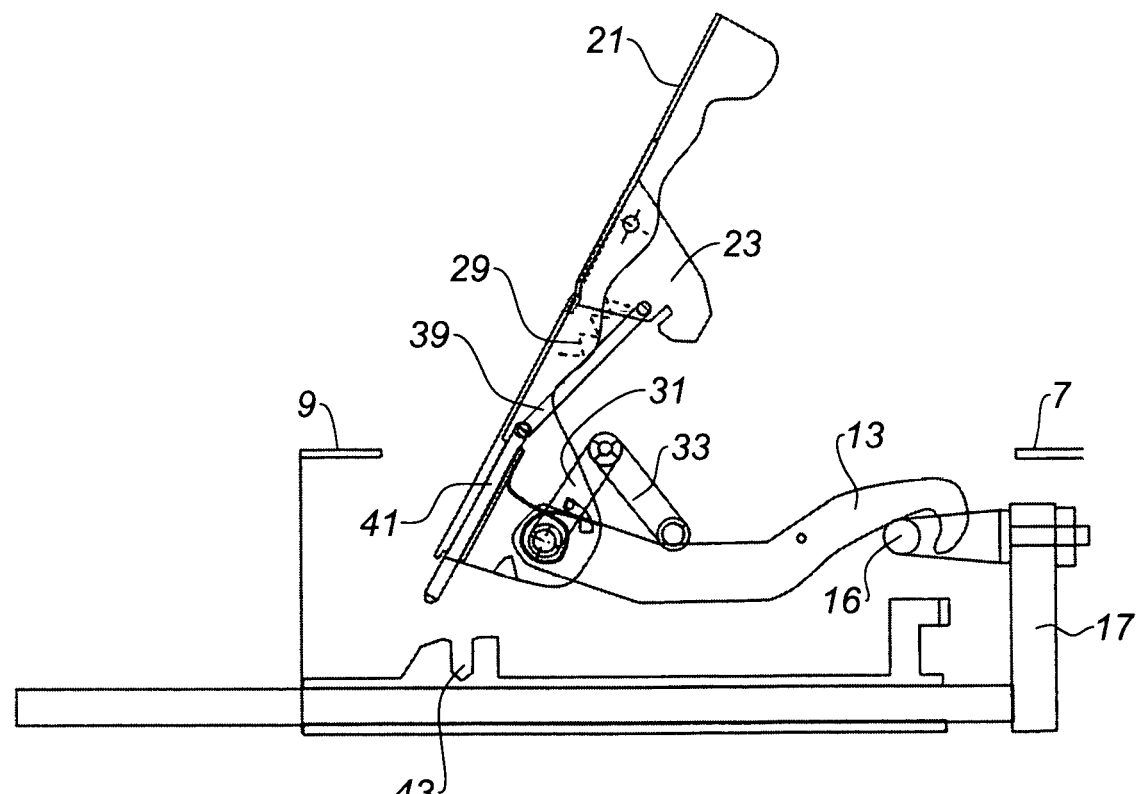
Figure 14:
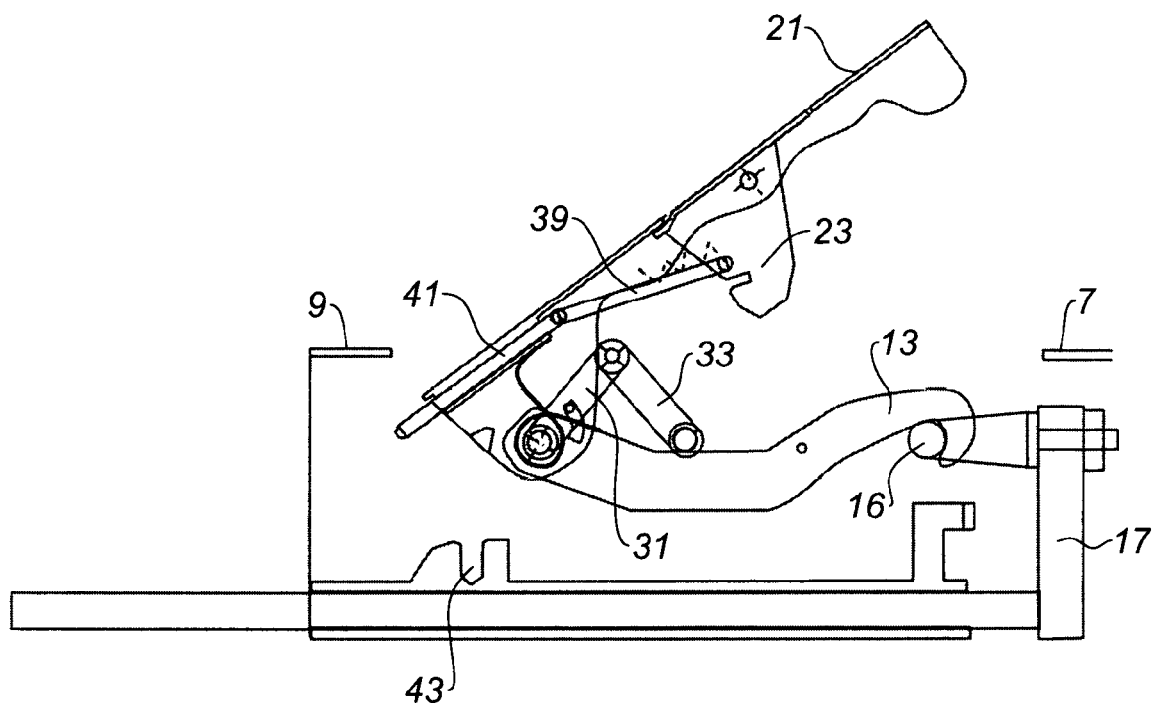
Figure 15:
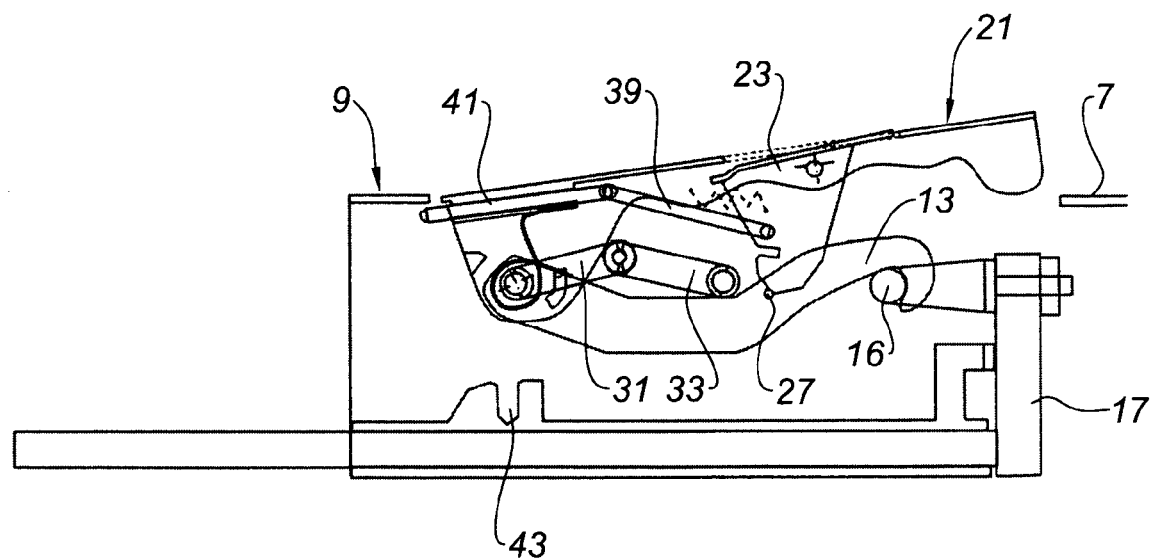

This disengagement of the finger 41 relative to the immobilization notch 43 being completed, it is possible to make the gripping handle 21 pivot about its spindle 15 to its closed position, by virtue of which the hook 13 returns to its locking position on the counter-hook 16 (see FIGS. 13 to 15).

Figure 16:
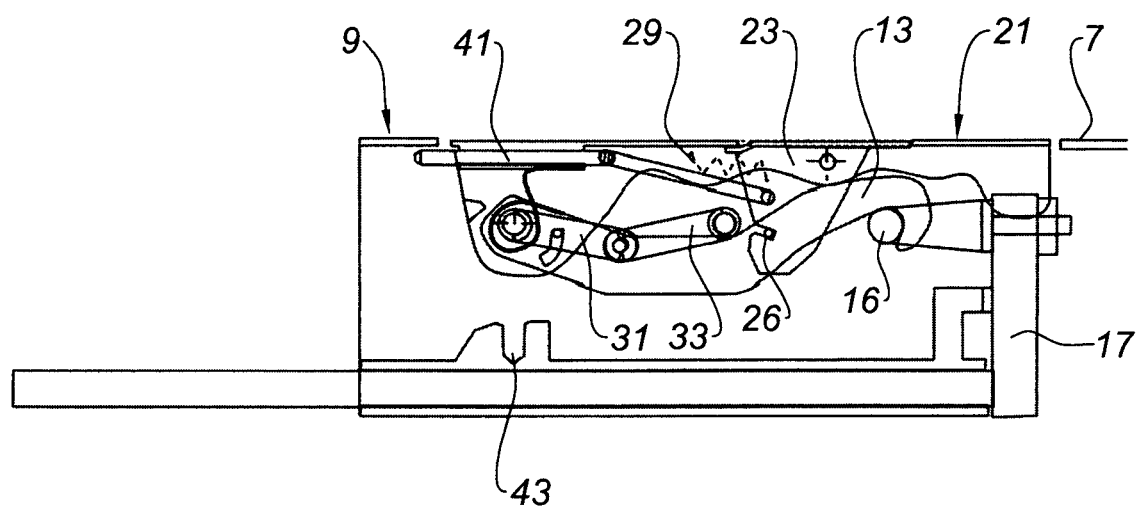

Finally, by completely folding down the gripping handle 21 into the plane of the outer wall of the opening portion 9, the user engages the recess 26 of the trigger 23 on the pin 27, and thereby replaces the locking device in its initial position (see FIG. 16).

Figure 17:
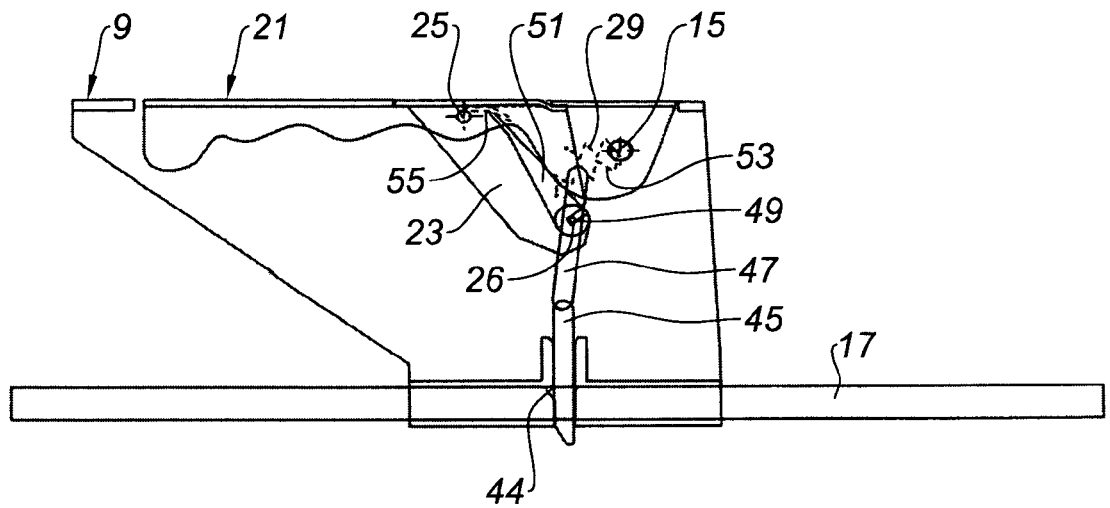
FIGS. 17 and 18 represent schematically an opening sequence of a second embodiment of the locking device according to the invention.
Figure 18:
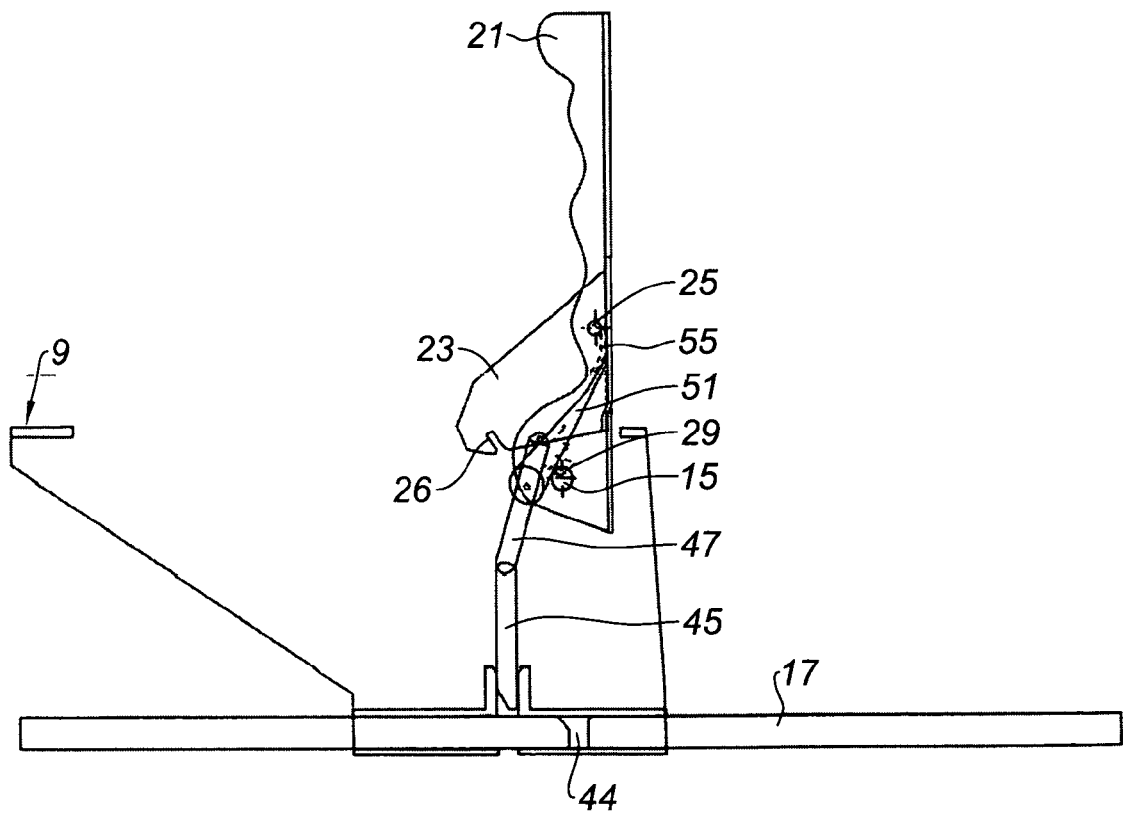

In the embodiment shown in FIGS. 17 and 18, the fixed portion 17 comprises an orifice 44 in which a locking finger 45 can be engaged, itself being mounted so as to pivot on a link rod 47, which is in turn mounted so as to pivot on the gripping handle 21.

In the closed position shown in FIG. 17, the recess 26 of the trigger 23 interacts with a pin 49 mounted on the link rod 47.

Moreover, an immobilizing cam 51 mounted so as to pivot about the pin 49 is provided, this cam being returned by a spring 53 pressing against an abutment 55 secured to the gripping handle 21.

To open this locking device, the user begins by pressing on the trigger 23 so as to disengage the recess 26 from the pin 49 by the rotation of this trigger about its spindle 25.

This makes it possible to release the gripping handle 21 which can then be made to pivot about its spindle 15 in order to bring it to its position shown in FIG. 18.

In so doing, the link rod 47 extracts the finger 45 from its orifice 44, which therefore makes it possible to unlock the opening portion 9 relative to the fixed portion 17, and thus slide the former relative to the latter (see FIG. 18).

It is also possible to note that, during the opening of the gripping handle 21, the cam 51 passes over the abutment 55 under the action of the spring 53, so that this cam is immobilized on the other side of this abutment as can be seen in FIG. 18: this immobilization of the cam relative to this abutment makes it possible to immobilize the gripping handle 21 in its position that can be seen in FIG. 18, by which it is possible to act manually on the movement of the opening portion 9.

In the embodiment that can be seen in FIGS. 19 to 25, the gripping handle 21 is secured to a body 56 mounted so that it can move in translation and in rotation inside a sheath 57, this body itself being extended by a finger 45, in turn able to interact with an orifice 44 formed in the fixed portion 17.

The body 56 comprises a lower portion 59 of smaller diameter, about which a spring 61 is placed pressing on the bottom of the sheath 57.

On the top edge of the sheath 57 there is an abutment 63 capable of interacting with a bayonet-shaped groove 65 recessed into the body 56.

Moreover, a trigger 23 similar to that of the previous embodiments is mounted flush with the gripping handle 21 and pivoting about a spindle 25 secured to this handle.

Figure 19:
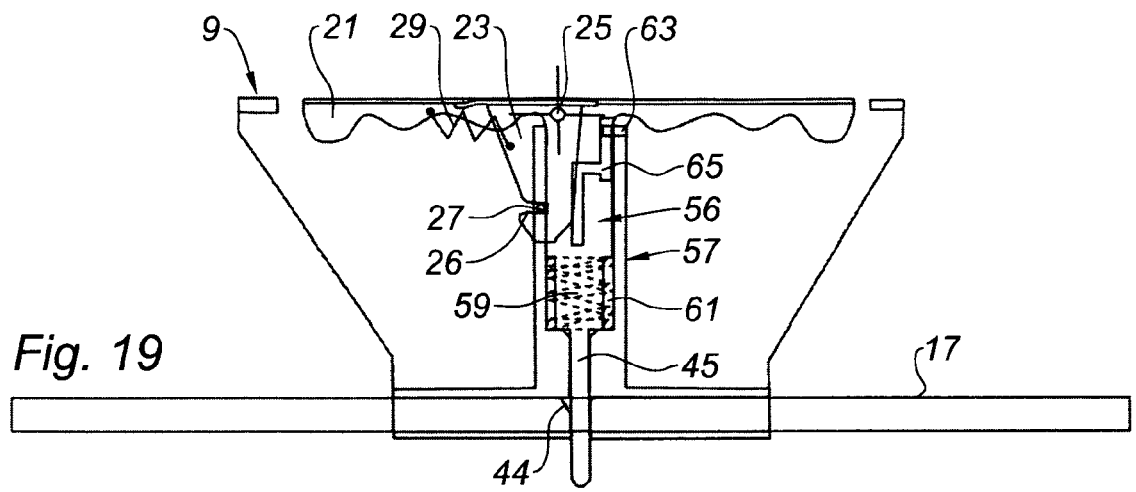
FIGS. 19 to 25 represent schematically an opening sequence of a third embodiment of the locking device according to the invention.

A spring 29 returns this trigger 23 to a position in which its recess 26 interacts with a pin 27 secured to the sheath 57 (see FIG. 19).

To open the locking device that has just been described, the user proceeds in the following manner.

Figure 20:
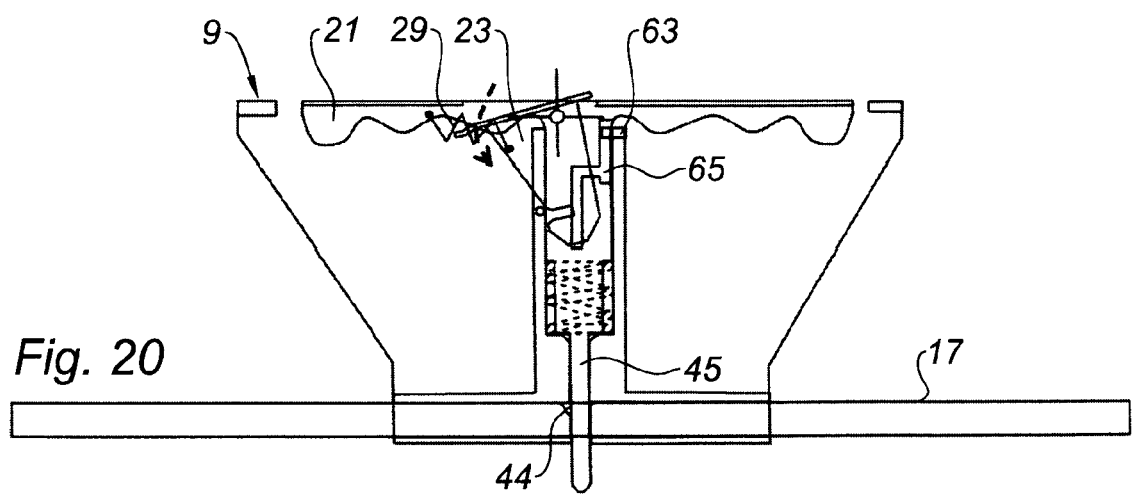

The user first of all begins by applying pressure to the trigger 23, so as to disengage the recess 26 of this trigger from the pin 27 (see FIG. 20).

Figure 21:
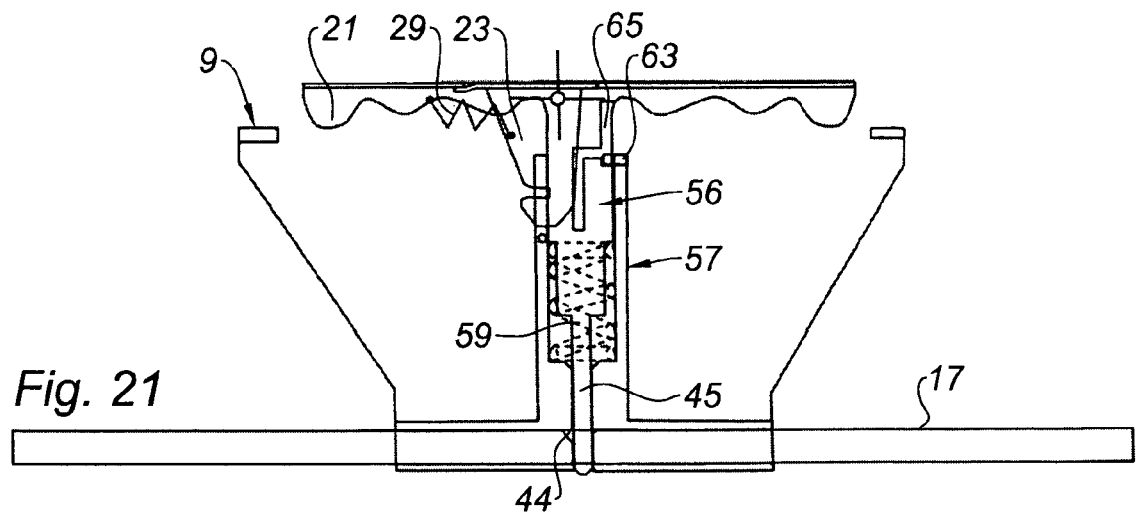

Under the effect of the spring 61, the body 56 and therefore the gripping handle 21 rise inside the sheath 57 until the abutment 63 reaches abutment in a first bend of the bayonet groove 65 (see FIG. 21).

In this intermediate position, the finger 45 is still placed inside the orifice 44, and a movement of the opening portion 9 relative to the fixed portion 17 is still not possible.

Figure 22:
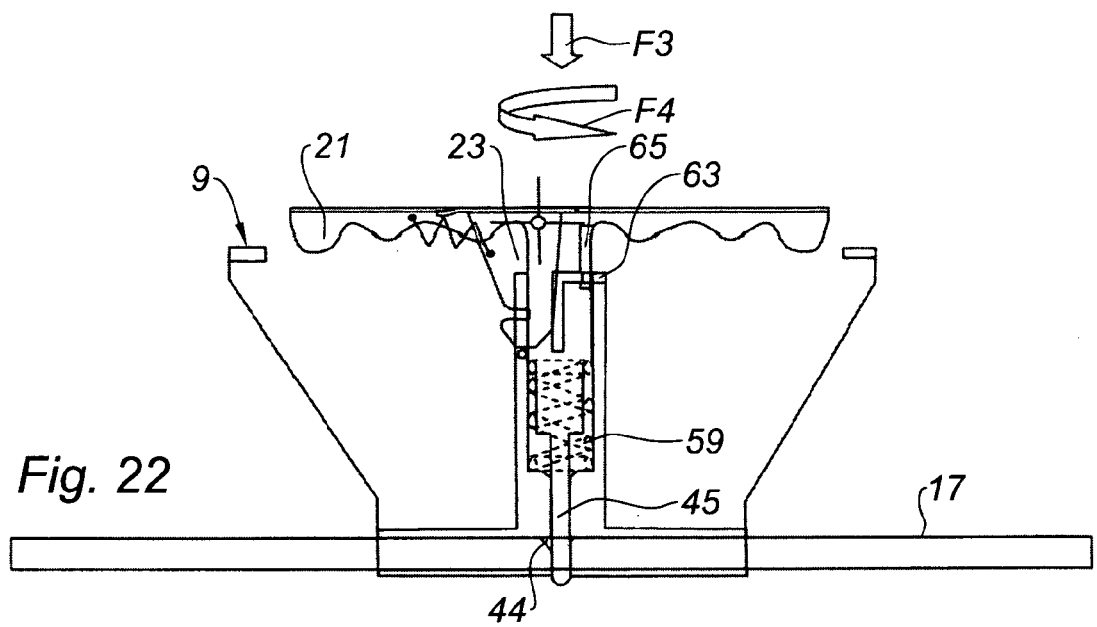

The next step consists in disengaging the abutment 63 from the first bend of the groove 65: this is done by applying a slight pressure toward the bottom of the gripping handle 21, as indicated by the arrow F3 in FIG. 22. Doing this, the user imparts on the gripping handle 21 a quarter-turn movement, as indicated by the arrow F4 in FIG. 22.

Figure 23:
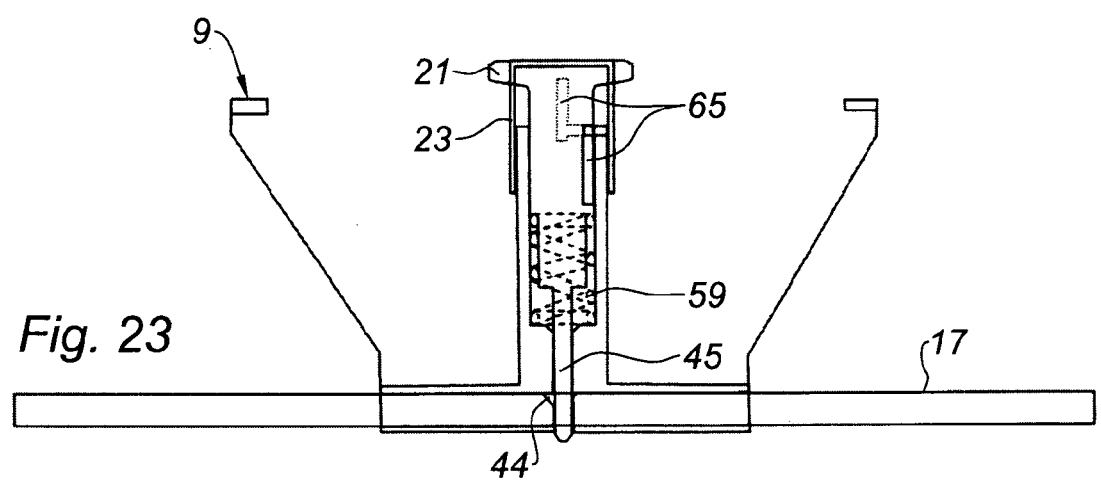

This quarter-turn movement makes it possible to run an intermediate portion of the groove 65 along the abutment 63 until this abutment is in the third and last portion of the groove 65 as can be seen in FIG. 23.

Figure 24:
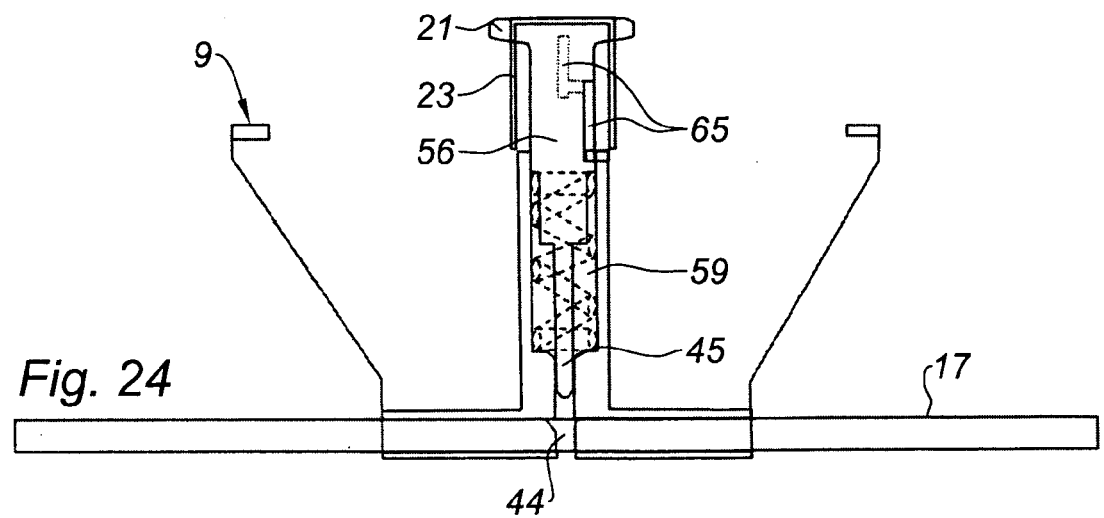
Figure 25:
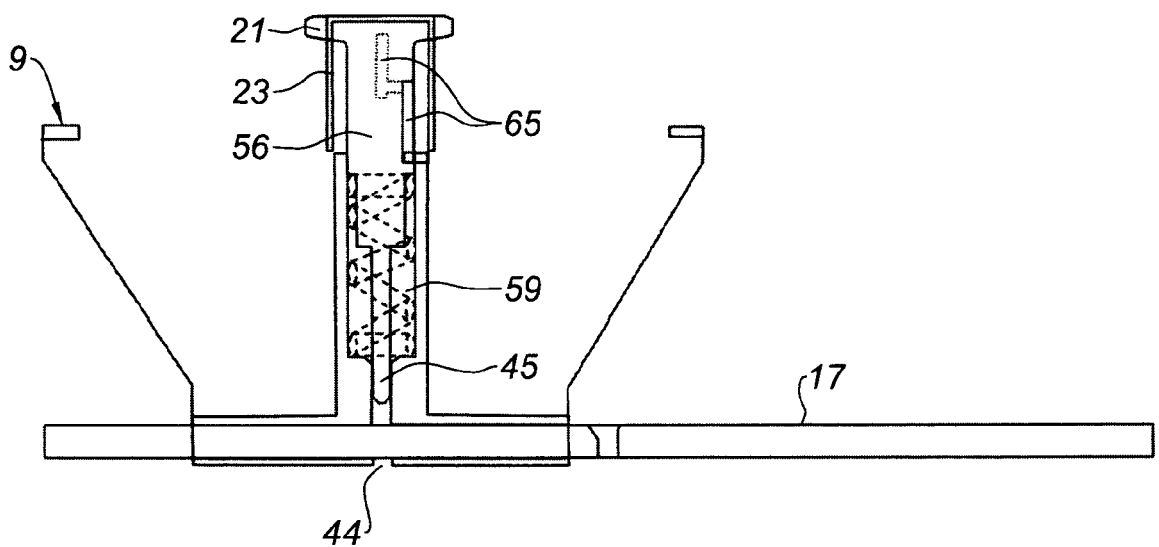

This last portion of the groove 65 allows an additional travel in translation of the gripping handle 21 making it possible to bring this handle from the position shown in FIG. 23 in which the finger 45 still interacts with the orifice 44 to the position shown in FIG. 24 in which this finger 45 has come out of this orifice, thereby allowing the opening portion 9 to slide relative to the fixed portion as shown in FIG. 25.

Figure 26:
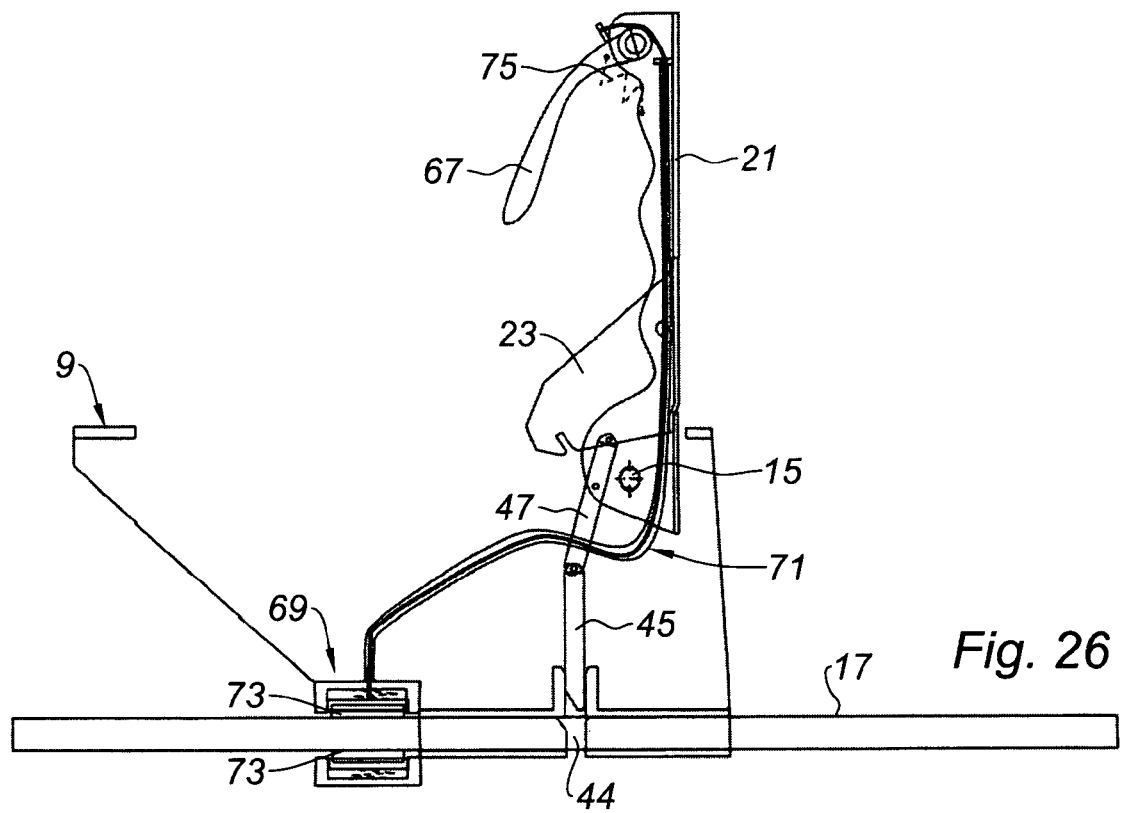
FIGS. 26 and 27 represent schematically the two positions of a braking system incorporated into the embodiment of FIGS. 17 and 18 and FIGS. 28 and 29 represent schematically an opening sequence of yet another embodiment of the locking device according to the invention.
Figure 27:
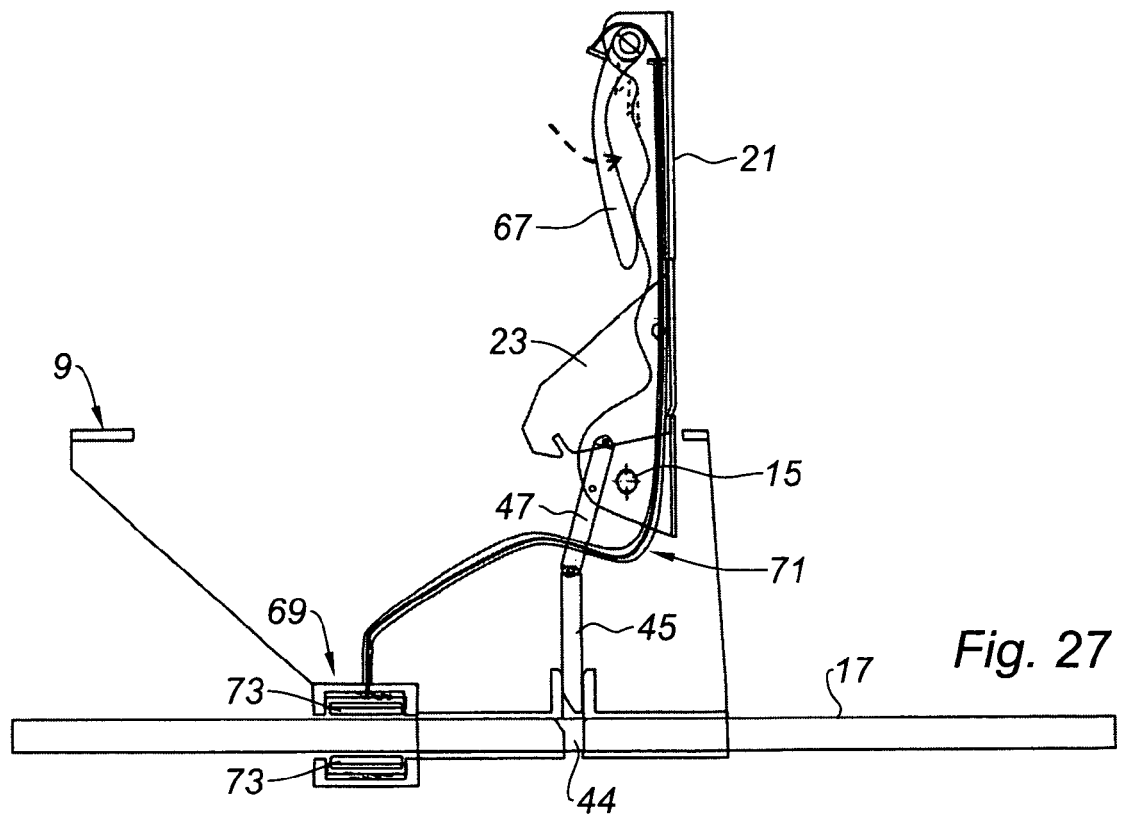

In the variant shown in FIGS. 26 and 27, established on the basis of the embodiment of FIGS. 17 and 18, a braking handle 67 connected to a braking device 69 via a braking cable 71 has been incorporated into the gripping handle 21.

The braking device 69 may typically comprise two shoes 73 capable of pinching the fixed portion 17 under the action of the cable 71.

A return spring 75 tries to place the braking handle 67 in a position in which the brake shoes are activated (see FIG. 26), thereby preventing the inadvertent movements of the opening portion 9 relative to the fixed portion 17.

In order to deactivate these brake shoes, the user folds down the braking handle 67 toward the gripping handle 21, as can be seen in FIG. 27, thereby making it possible to move the opening portion 9 at will relative to the portion 17.

The presence of these braking means that are active by default makes it possible, once the opening portion 9 has been moved relative to the fixed portion 17 for the purpose of carrying out turbojet maintenance operations, to prevent this opening portion 29 from closing again inadvertently at the risk of injuring an operator.

Figure 28:
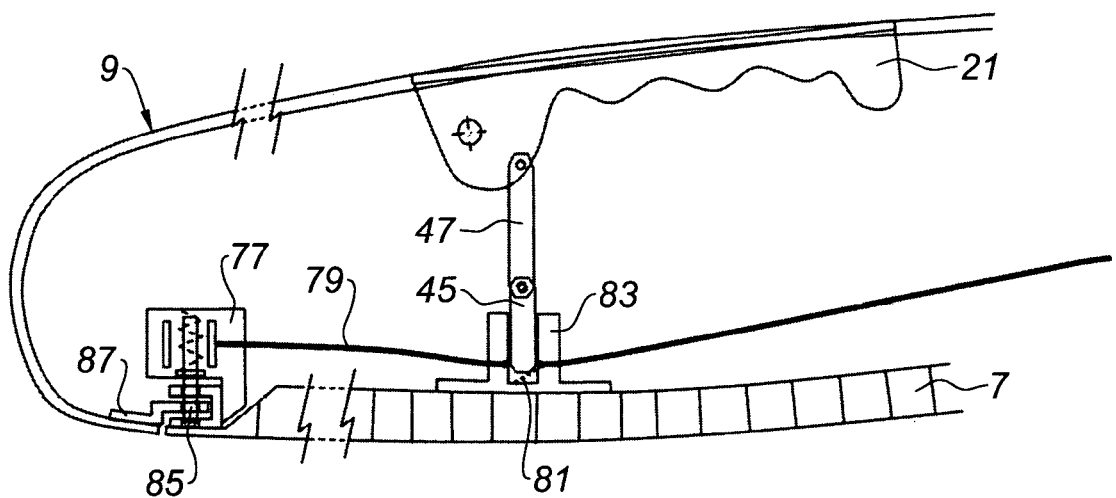
Figure 29:
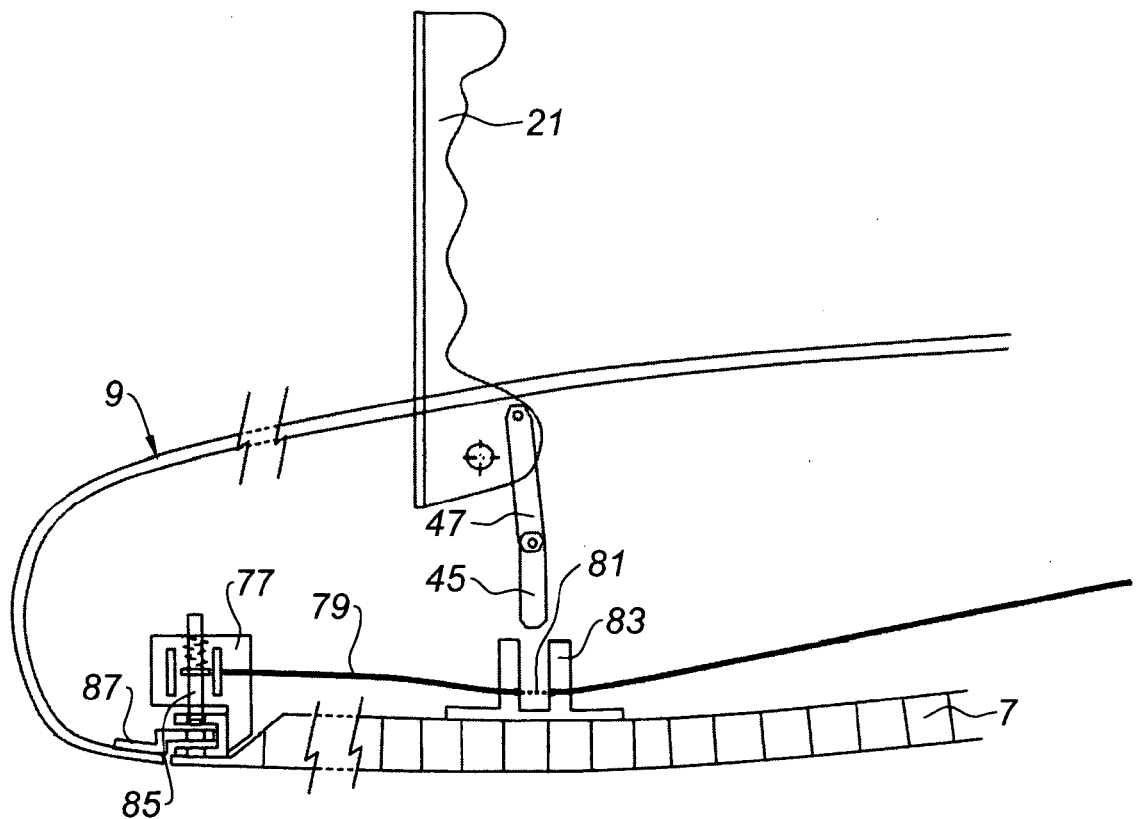

The embodiment shown in FIGS. 28 and 29 differs from that shown in FIGS. 17 and 18 in that the finger 45 does not directly lock the opening portion 9 relative to the fixed portion 17: this locking action is carried out by an electromagnetic bolt 77 connected via an electric cable 79 to a switch 81 placed at the bottom of a socket 83 capable of receiving the finger 45.

The electromagnetic bolt 77 comprises a latch 85 capable of interacting with a catch 87 secured to the opening portion 9.

When the gripping handle 21 moves from the closed position that can be seen in FIG. 28 to the open position that can be seen in FIG. 29, the finger 45 disengages from the socket 43 thereby causing the closure of the switch 81, and the translation of the latch 85 from a position in which it interacts with the catch 87 (FIG. 28) to a position in which this latch is disengaged from this catch (see FIG. 29) thereby allowing the opening portion 9 to be moved relative to the fixed portion 17 by means of the gripping handle 21.

As will have been understood in the light of the aforegoing description, the gripping handle 21 allows, on the one hand, the locking device to be opened, and, on the other hand, the opening portion to be moved manually relative to the fixed portion.

These movements are allowed because, in the open position, the movements of this gripping handle in the direction of movement of the opening portion relative to the fixed portion are immobilized.

Naturally, it should be understood that this gripping handle 21 is designed in an appropriate manner, that is to say so as to be able to withstand the actuation forces applied by the operator in order to carry out the opening and closing movements of the opening portion relative to the fixed portion.

The present invention is in no way limited to the embodiments described and shown, which are provided purely as examples.

The invention claimed is:

1. A device for locking an opening portion of a nacelle of a turbojet relative to a fixed portion, comprising:
    a locking means for locking said opening portion relative to said fixed portion, and
    an actuating means for actuating the locking means mounted on said opening portion and movable thereon between a closed position in which the actuating means allow for immobilization of said locking means and an open position in which the actuating means allow a release of the locking means, the actuating means comprising gripping means, a trigger for releasing said gripping means, and immobilization means for immobilizing in the open position said gripping means relative to said opening portion,
    wherein the gripping means, when immobilized in the open position, are configured to allow for manual displacement of the opening portion relative to the fixed portion in both directions of movement of said opening portion, the gripping means being flush with an outer wall of the opening portion in the closed position,
    wherein said locking means comprises at least one finger itself being mounted so as to pivot on a link rod which is in turn mounted so as to pivot on the gripping means, said locking means being mounted so as to be able to move on said opening portion and capable of interacting with an orifice formed in said fixed portion, and
    wherein said immobilization means comprises an immobilizing cam.

2. The device according to claim 1, wherein said gripping means are configured to move in rotation between said closed and open positions.

3. The device according to claim 1, wherein said gripping means are configured to translate between said closed and open positions.

4. A nacelle of a turbojet, comprising said fixed portion and said opening portion, and the device for locking these two portions relative to one another according to claim 1.

5. The nacelle according to claim 4, wherein said opening portion is mounted so as to slide relative to said fixed portion.

* * * * *